Sept. 20, 1960     M. A. SHAW     2,953,242
CONTAINER AND TIME INDICATOR
Filed July 31, 1957     2 Sheets-Sheet 1
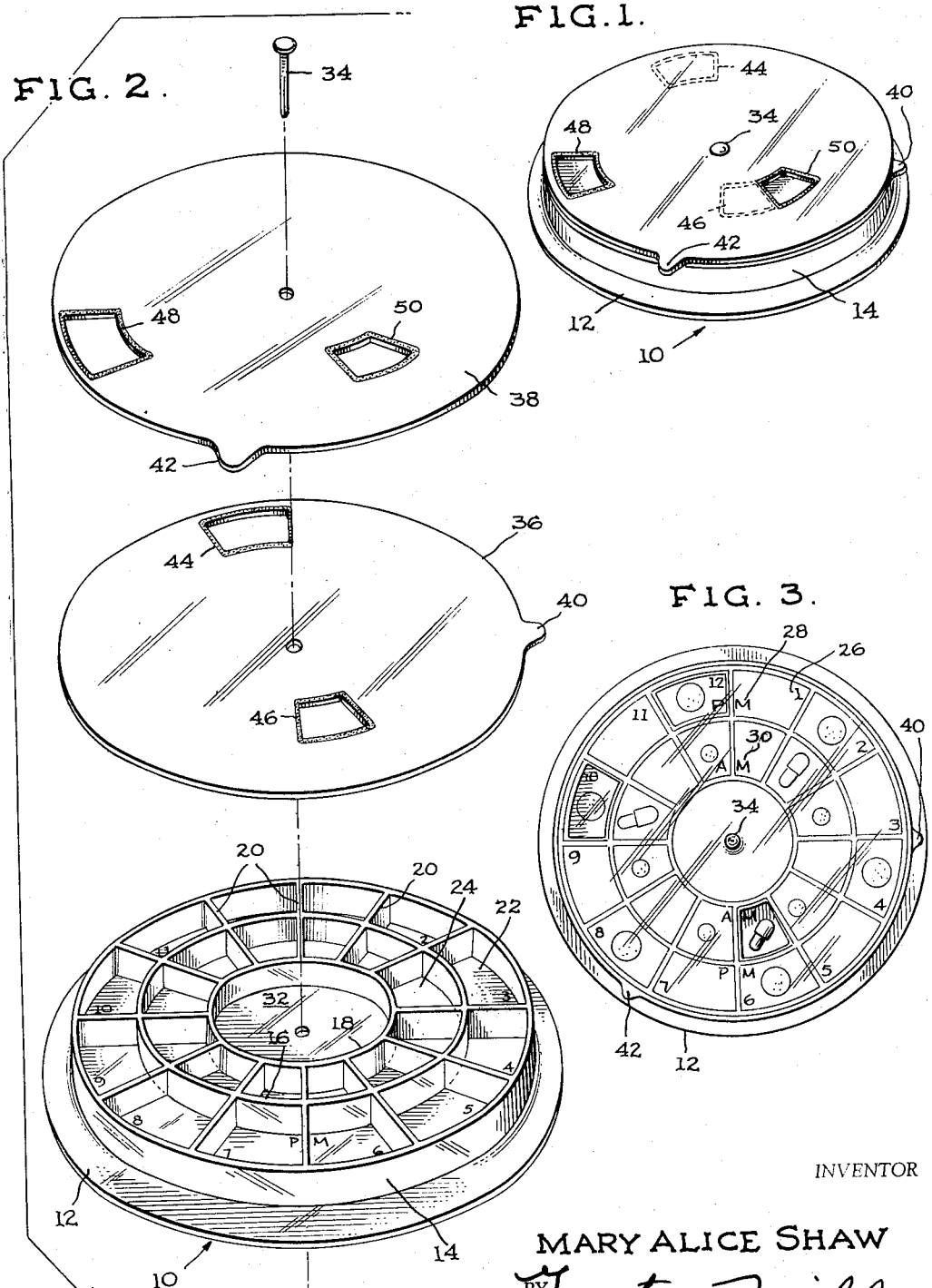
INVENTOR
MARY ALICE SHAW
BY *Gustave Miller*
ATTORNEY Sept. 20, 1960   M. A. SHAW   2,953,242
CONTAINER AND TIME INDICATOR
Filed July 31, 1957   2 Sheets-Sheet 2

INVENTOR

MARY ALICE SHAW
BY *Gustave Miller*
ATTORNEY

United States Patent Office 2,953,242
Patented Sept. 20, 1960

2,953,242
CONTAINER AND TIME INDICATOR

Mary Alice Shaw, Arlington, Va.; David B. Kinney, administrator of the estate of Mary Alice Shaw, deceased, assignor to Gustave Miller, Washington, D.C.

Filed July 31, 1957, Ser. No. 675,416

6 Claims. (Cl. 206—42)

This invention relates to a container and time indicator, and has for an object to provide a container providing compartments and indication means for each compartment indicating the time that the contents of each compartment should be utilized.

A further object of this invention is to provide a container and time indicator especially intended for use in connection with medical, vitamin, or other types of pills, tablets, capsules, or the like, with the container including a plurality of compartments each of size containing one or more pills, tablets, capsules, or the like, intended to utilize at a particular time of the day or of the night, with an indication on each compartment as to the time of day or night at which the contents of the compartment should be utilized.

A further object of this invention is to provide a container and time indicator provided with a cover means which is operable to open a particular compartment to make the contents of that compartment available when desired, with an indication at the compartment as to the time of day or night as to when the contents of the compartment should be utilized.

A further object of this invention is to provide a container and time indicator for pills, tablets, capsules, or the like, whereby the day's supply, or even a week's supply, of pills, tablets, capsules, or the like may be placed in each compartment for use at a particular time of the day, so that when that time of day is reached the user will be in a position to use the particular contents of each compartment intended for use at that particular time of day.

A further object of this invention is to provide a container and time indicator which may be made in several forms, wherein one form may be more convenient for one type of user and another form may be more convenient for another type of user, and wherein one form may be made in substantially disc-like form, and a third form may be made substantially in a rectangular form, all of the forms having in common that they are provided with a compartment indicative of the day, and in each of which the compartment may be filled once a day, or once a week, with the particular pills, tablets, capsules, or the like intended to use at that particular time of the day.

There are many individuals for whom it is prescribed that they take certain pills, tablets, capsules, or the like or certain combinations thereof, at certain specified times of the day, for a short or long period of time, and it is quite a problem for the individual to remember which particular pills, or tablets, or capsules, or combination thereof the individual should take at a particular time of the day. With this invention the individual may set out in the container of this invention the particular pills, tablets, capsules, or combination thereof that the individual must use at each particular time of the day, following a written prescription of what particular item must be utilized at a particular time of the day, and place each item or combination thereof in the particular compartment for the particular time of the day and thus be sure that when the particular time of the day arrives they will be in a position to take the particular item intended for that particular time of the day, without trusting to memory. The container and time indicator of this invention may be made of a size to hold a single day's supply or a week's supply, and when made in a single day's supply, the individual will refill the container once a day and then will merely empty the particular compartment at the particular time of the day and thus be assured that they are receiving the right item for the particular time of the day, and when the container is of a size to contain more than a day's supply, as for instance a week's supply, it may be filled once a week with sufficient items in each compartment for seven days and each day the individual will remove just one item or combination of items from a particular compartment at a particular time being sure of taking the right combination of item or items for that particular day, and if necessary may count the remaining items left in the compartments which will be preferably transparent to be sure that the individual is taking just the right amount of that particular day.

In brief, the invention consists of a container having a plurality of compartments, one for each particular time of day, preferably one for each hour of the day, with a cover which may be so manipulated as to open either of particular compartments or open each compartment in succession with each successive period of time so that the contents of a compartrment may be removed as needed for use, whereas the compartments which have not yet been used will still remain covered.

With the above and related objects in view, this invention consists in the details of construction and combination of parts as will be more fully understood from the following description, when read in conjunction with the accompanying drawing in which:

Fig. 1 is a perspective view of the container and time indicator of this invention with the compartment entirely closed.

Fig. 2 is an exploded perspective view of the container of Fig. 1.

Fig. 3 is a top plan view of the container of Fig. 1 with the 6 a.m. o'clock open for access to its contents.

Figure 4:
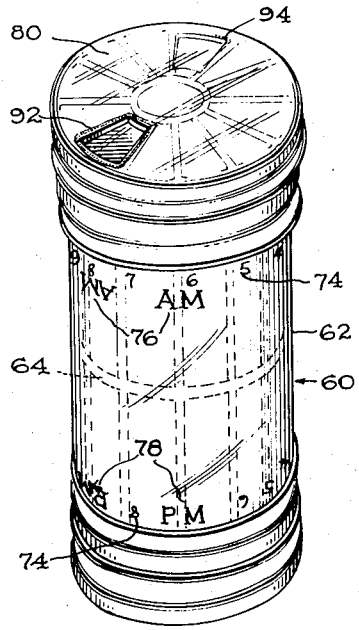
Fig. 4 is a perspective view of a double end bottle form of this invention.

There is shown at 10 a disc-like embodiment of the container and time indicator of this invention. In this form 10, the container 10 is provided with a projecting circular base 12 having a plurality of upstanding concentric flanges 14, 16 and 18 each divided by 12 radial flanges 20, thereby providing 24 individual compartments 22 and 24 thereby providing a series of compartments 22 which are concentric with the series of compartments 24. Each compartment 22 and 24 has a time indication on the base portion thereof as shown at 26, 28, and 30, the indication 26 being the numerals from 1 to 12, the indication 28 being the letters p.m. to show that the series of compartments 22 are for the p.m. hours of the day, while the indication 30 are the letters a.m. to show that the compartments are for the a.m. hours of the day. Obviously, any other equivalent indication means may be substituted for those shown, such as the words "daytime" and "night-time" or any other indication of similar import.

The upstanding flange 18 provides a central area 32 which is utilized to receive a pivot pin 34 through the center thereof about which may be pivoted two overlapped cover members 36 and 38, each cover member 36 and 38 being preferably of transparent or translucent material, and each cover member 36 and 38 being provided with a rotation facilitating tab 40 and 42.

The diameter of each of the cover members 36 and 38 will at least be equal to the diameter of the circle provided by the outer upstanding flange 14 on base 12, and the handle tabs 40 and 42 will extend beyond the flange 14, but preferably not beyond the projecting portion of the base 12 beyond flange 14 so that in effect the projecting portion of the base 12 lies beyond the projection of the handle tabs 40 and 42 and thus tends to protect the tabs 40 and 42 from breaking.

The cover 36 is provided with two openings 44 and 46, and the cover 38 is likewise provided with two openings 48 and 50, the openings 44 and 48 being substantially of the size and shape of the series of compartments 22, and radially spaced from the center to conform to the spacing of the series of compartments 22, and similarly the openings 46 and 50 are radially spaced from the center corresponding to the radial distance of the series of compartments 24 from the center of the base 12. However, the openings 46 and 48 on cover 36 are angularly displaced from each other at a different angle from the angle at which the openings 48 and 50 in cover 38 are displaced from each other. As a result, when the cover 38 overlaps the cover 36 over the compartments, the cover 38 may be so rotated relative to the cover 36 that none of the openings are aligned with each other, whereby all the compartments of both series are closed, or the covers may be rotated relative to each other so that either of the openings 44 and 48 line up over a particular selected compartment, or the openings 46 and 50 line up over a particular selected compartment of the inner angular series of compartments 24, but due to the different angular displacement of the openings, it is impossible for more than one selected compartment to be opened simultaneously.

To facilitate aligning the selected openings over a particular selected compartment, each opening in each cover may be outlined in a color or opaque material so that the position of the openings will be readily visible facilitating the rotation of the covers to open any particular selected compartment of either series.

In operation, the user may fill the particular compartment with a pill, tablet, capsule, or desired combination thereof according to the prescription that, that individual must follow, in accordance with the written prescription at one time during the day, and then need merely remember to take the contents of the particular compartment at the particular time indicated thereon and thus be sure of following the right prescription.

This container 10 being substantially in disc-like form, it may be readily carried in a large lady's handbag, or may be placed on one's night table for nighttime use. Obviously it may be placed flat on the table or if desired any conventional manner of supporting it at an angle in a way that a photograph is supported by an easel on its bottom may be provided.

Figure 5:
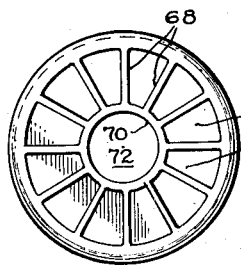
Fig. 5 is a top plan view of the bottle form of Fig. 4, with the covers removed.
Figure 6:
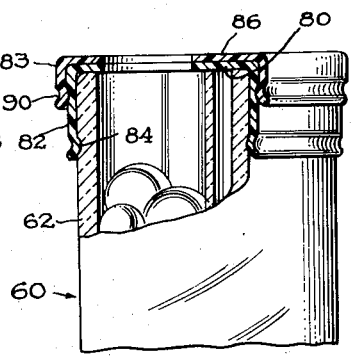
Fig. 6 is a fragmentary broken away view showing the relatively rotatable covers in an opening aligned position for access to the contents of such compartments.

The embodiment of this invention shown in Figs. 4, 5, and 6 is somewhat like a bottle having a greater depth than its diameter, just as the embodiment in Figs. 1, 2, and 3 is like the bottle of an extremely shallow depth and substantially of greater diameter. In the embodiment of this invention shown at 60 in Figs. 4, 5 and 6, there is shown a bottle-like cylindrical container 62 preferably of transparent or translucent glass or plastic material provided with a central floor 64 midway between its ends, with the bottle 62 on each side of the midway floor 64 divided into 12 compartments 66 by radial dividing walls 68 and an annular wall 70 thus providing a central cylindrical compartment 72. If desired the midway floor 64 may be apertured to coincide with the annular wall 70 and thus provide an endless compartment therethrough. This compartment 72 may be utilized for holding a prescription or directions for filling and using the compartment 66.

Each individual compartment may have a numeral from 1 to 12 on the outside thereof as shown at 74 and in addition one series of compartments at one end is also provided with an additional indicator such as the letters a.m. at 76 which may be provided in reverse if desired and the letters p.m. at 78 which likewise may be provided in reverse if desired. Alternatively, some of the compartments may have their transparent walls somewhat colored to differentiate daytime from nighttime compartments.

A pair of overlapping covers are provided at each end of the bottle 62, the pair at each end being identical. The inner cover 80 has a long overlapping flange 82 provided with a circular indentation 84 adapted to cooperate with a corresponding annular recess in the outer wall of the bottle 62, thus rotatably holding this cover 82 in position yet enabling it to be snapped on or off if desired. The outer cover 86 has a short flange 88 likewise provided with an indentation 90 cooperating with an annular recess in the inner cover flange 82 so that the outer cover may be readily rotated about the inner cover or snapped on or off therefrom when necessary. Each cover 80 and 86, which is of transparent or translucent material, preferably plastic, is also provided with a sector shaped opening 92 and 94 corresponding in size and shape to the size and shape of the respective compartments 66 and visibly outlined in different color to more readily locate their position.

In operation, each compartment 66 will be filled once a day or once a week as may be desired with the particular pills, tablets, capsules or combinations thereof according to a prescription, which prescription may be stored in the compartment 72 so as to be available at the time of refilling the container 60.

The operation of this container 60 is identical with that of the previously described embodiments, each selected compartment is filled according to the prescription and then is utilized at the time of day indicated thereon by lining up the openings 92 and 94 over the particular compartment according to the time of day or night and then tapping out the pill, tablet or capsule therein as needed.

In each embodiment, it will be apparent that there is space available for printed matter, the first embodiment on the projecting portion of the base 12, in the bottle embodiment at 60, the printed matter may be in the form of a separate curled piece of paper placed in the compartment 72 and the outside wall or the end cover may likewise be printed.

Having thus set forth and disclosed the nature of this invention, what is claimed is:

1. A container and time indicator comprising a container, a plurality of compartments in said container, cover means on said container operable to open a selected compartment, and time indications coordinated with each said compartment indicating the time at which the contents of the said compartment should be removed therefrom for utilization, said compartments being provided in two separate series, there being the same number of compartments in each series, the time indications of one series being for one-half of the day, the time indications of the other series being for the other half of the day, said cover means including two overlapped cover members, each said cover member having two angularly displaced openings therethrough, one for each series, whereby when said cover member openings are aligned over a selected compartment, the contents of only the selected compartment becomes available through the aligned openings.

2. The container and indicator of claim 1, at least the overlapping cover member being transparent, and the opening therein being outlined to indicate its location.

3. A container and time indicator comprising a container, a plurality of compartments in said container, cover means on said container operable to open a selected compartment, and time indications coordinated with each said compartment indicating the time at which the contents of the said compartment should be removed therefrom for utilization, said compartments being provided in two separate series, there being the same number of compartments in each series, the time indications of one series being for one-half of the day, the time indications of the other series being for the other half of the day, said series being annular, said cover means including two overlapped cover members on each annular series, each said cover member having two angularly displaced openings therethrough, one for each series, whereby when said cover member openings are aligned over a selected compartment, the contents of only the selected compartment becomes available through the aligned openings.

4. A container and time indicator comprising a container, a plurality of compartments in said container, cover means on said container operable to open a selected compartment, and time indications coordinated with each said compartment indicating the time at which the contents of the said compartment should be removed for utilization, said compartments being provided in two separate series, there being the same number of compartments in each series, the time indications of one series being for one-half of the day, the time indications of the other series being for the other half of the day, each said series being annular, one said annular series being concentric about the other said annular series, said cover means including two overlapped cover members, each said cover member having a compartment size opening therethrough for each series, the openings in one cover member being of different angular displacement than the openings in the other cover member, whereby when said cover member openings are aligned over a selected compartment, the contents of only the selected compartment become available through the aligned openings.

5. A container and time indicator comprising a container, a plurality of compartments in said container, cover means on said container operable to open a selected compartment, and time indications coordinated with each said compartment indicating the time at which the contents of the said compartment should be removed therefrom for utilization, said compartments being provided in two separate series, there being the same number of compartments in each series, the time indications of one series being for one-half of the day, the time indications of the other series being for the other half of the day, each said series being annular, said cover means including two overlapped transparent circular members, each said cover member having two visible outlined angularly displaced compartment size openings therethrough, one for each series, whereby when said cover member openings are aligned over a selected compartment, the contents of only the selected compartment become available through the aligned openings.

6. The container and indicator of claim 5, and rotation facilitating means on each cover member.

References Cited in the file of this patent

UNITED STATES PATENTS

| | | |
|---|---|---|
| 243,925 | La Bau | July 5, 1881 |
| 611,136 | Mason | Sept. 20, 1898 |
| 975,681 | Ernsberger | Nov. 15, 1910 |
| 1,717,060 | Mottayaw | June 11, 1929 |
| 1,817,562 | Hodge | Aug. 4, 1931 |
| 1,896,976 | Schifferdecker | Feb. 7, 1933 |

FOREIGN PATENTS

| | | |
|---|---|---|
| 299,873 | Switzerland | Sept. 1, 1954 |
| 934,493 | Germany | Oct. 27, 1955 |